United States Patent [19]
Gonzalez

[11] Patent Number: 5,472,010
[45] Date of Patent: Dec. 5, 1995

[54] FLUID DIVERTER

[75] Inventor: Teodoro J. Gonzalez, Santa Clarita, Calif.

[73] Assignee: Emhart Inc., Newark, Del.

[21] Appl. No.: 404,843

[22] Filed: Mar. 8, 1995

Related U.S. Application Data

[63] Continuation of Ser. No. 117,858, Sep. 8, 1993, abandoned.
[51] Int. Cl.⁶ .................................................. F16K 11/02
[52] U.S. Cl. ........................................ 137/119; 137/454.6
[58] Field of Search ............................... 137/119, 454.4, 137/454.6

[56] References Cited

U.S. PATENT DOCUMENTS

| | | |
|---|---|---|
| Re. 32,981 | 7/1989 | Marty . |
| 3,056,418 | 10/1962 | Adams ............................ 137/119 |
| 3,459,207 | 8/1969 | Bacheller . |
| 3,472,279 | 10/1969 | Sanderson ................... 137/119 X |
| 3,875,960 | 4/1975 | Miller ............................. 137/119 |
| 4,008,732 | 2/1977 | Fichter ........................... 137/119 |
| 4,301,972 | 11/1981 | Rudelick . |
| 4,316,485 | 2/1982 | Christiansen ................. 137/119 X |
| 4,577,653 | 3/1986 | Marty ............................. 137/119 |
| 4,609,006 | 9/1986 | Parkison et al. . |
| 4,798,221 | 1/1989 | Crawford ....................... 137/119 |
| 4,934,402 | 6/1990 | Tarnay et al. ................. 137/119 |

Primary Examiner—Robert G. Nilson
Attorney, Agent, or Firm—J. Bruce Hoofnagle

[57] ABSTRACT

A fluid diverter controls water flow through a faucet assembly which includes a spout and a handspray. The diverter includes a housing and a shaft mounted therein for reciprocal movement, with a piston and a cup valve mounted on opposite ends of the shaft. When water is supplied to the faucet assembly and the handspray is turned off, water pressure builds up within a first compartment of the diverter between the piston and the cup valve such that the cup valve is moved off its seat to establish water flow through a first outlet passageway to the spout. When the handspray is operated, water from the interior of the diverter flows through a second outlet passageway leading to the handspray, and also into a second compartment on the opposite side of the piston. A differential pressure is achieved between the two compartments by providing a notch of a selected size in an annular rim portion of the housing at the second outlet passageway. The size of the notch is made sufficiently large so that particle contaminants pass easily through the diverter.

10 Claims, 4 Drawing Sheets

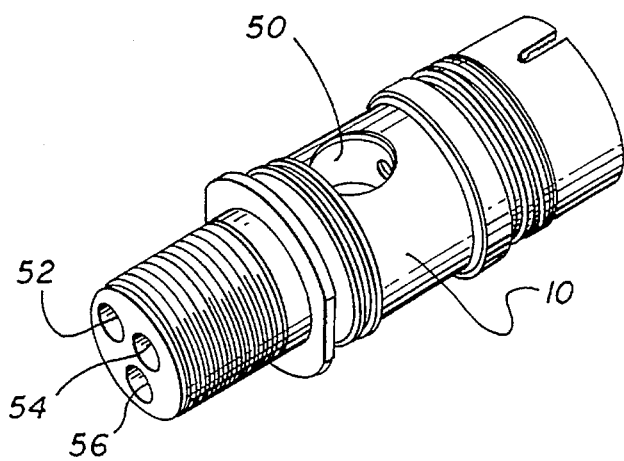
FIG. 2
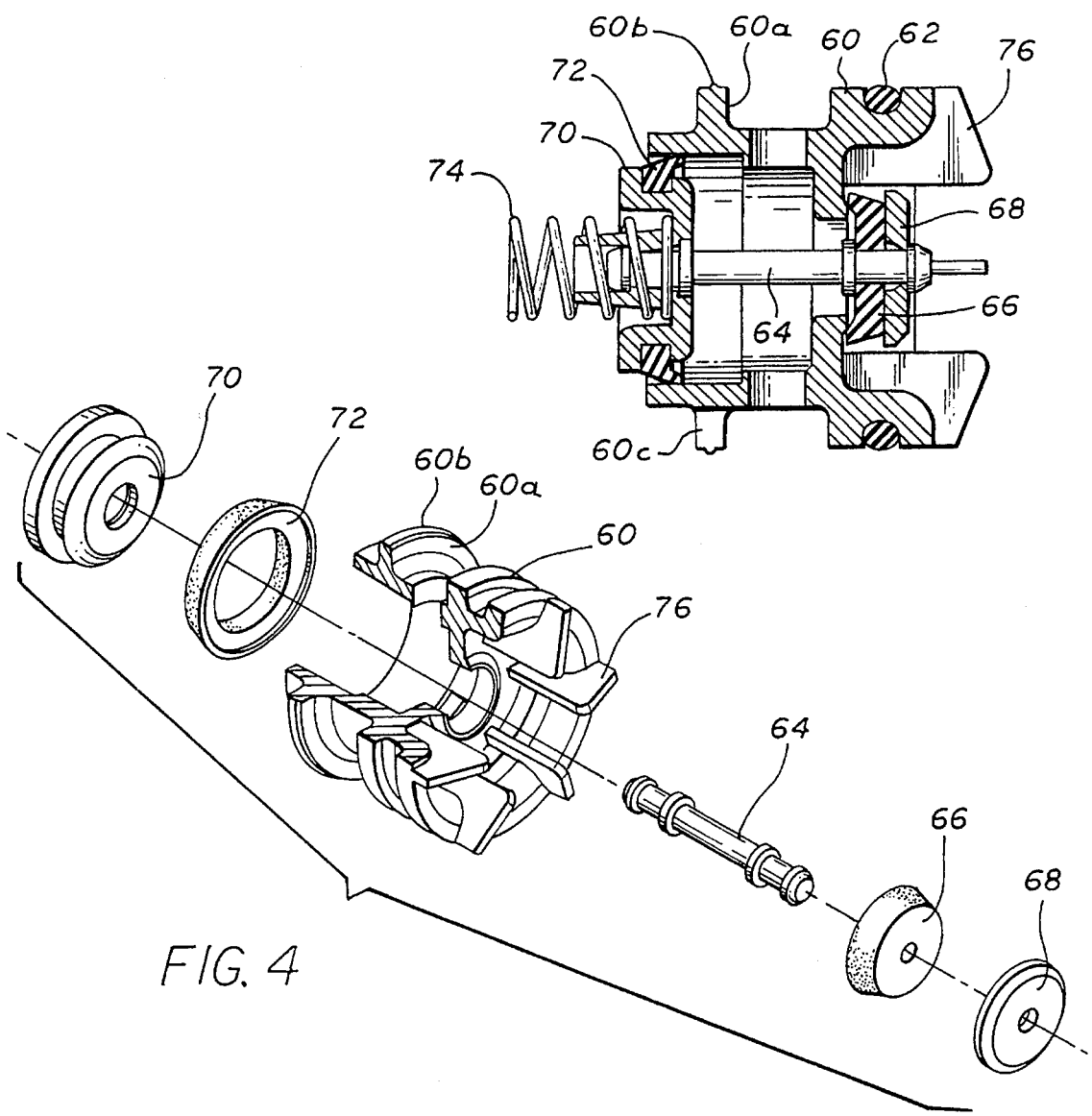
FIG. 3
FIG. 4

5,472,010

FLUID DIVERTER

This is a continuation of application Ser. No. 08/117,858, filed September 8, 1993, now abandoned.

BACKGROUND OF THE INVENTION

The present invention relates to a fluid diverter for use in conjunction with faucet assemblies such as the type using the single operator mixing valve as described, for example, in co-pending application Ser. No. [4686-25].

The fluid diverter of the present invention is of the same general type described, for example, in U.S. Pat. Nos. 4,798,221; 4,609,006; and RE32,981.

In kitchen faucets, it is common for water to pass selectively through a spout or a handspray. As described in U.S. Pat. No. 4,798,221, diverter valves are commonly used in such faucet assemblies to divert water to either the spout or the handspray. The diverter valve automatically shuts off the water flow through the faucet spout when the spray is turned on. On the other hand, when the spray is turned off, the diverter valve automatically permits water to flow to the spout.

As pointed out in U.S. Pat. No. 4,798,221, cartridge-type diverter valves are known in the prior art. For example, U.S. Pat. No. 4,577,653 discloses a cartridge valve mechanism with biasing prongs to bias the valve element to one position.

An objective of the present invention is to provide an improved miniature fluid diverter which operates to shut off completely the flow of water from the spout of the faucet when the spray is turned on, and to hold the water flow to the spout completely turned off during operation of the handspray to avoid annoying drips or trickles of water stream from the spout when the spray is in operation.

Another objective of the invention is to provide such an improved fluid diverter in which the foregoing objective is achieved in an expeditious manner and by means of an extremely simple mechanism.

Yet another objective of the invention is to provide such an improved fluid diverter which is constructed to minimize clogging of the assembly due to contaminants.

SUMMARY OF THE INVENTION

A fluid diverter is provided which is adapted to be received in a well in the side of a solid metal casing of a faucet assembly, and which is positioned adjacent to the outlet port of the faucet. The diverter includes a housing and a piston shaft mounted in the housing for reciprocal motion. A piston element and a valve element are mounted on opposite ends of the shaft, the valve element controlling water flow to the spout of the faucet. When the handspray is turned off, water pressure builds up on one side of the piston element, causing it to open the valve element to direct water from the faucet to the spout. When the handspray is turned on, a pressure differential is developed on opposite sides of the piston element, causing it to close the valve element to cut off water to the spout as water flows to the handspray.

BRIEF DESCRIPTION OF THE DRAWINGS

FIG. 2 is a perspective representation of a metal casing which is included in the faucet assembly of FIG. 1, and which includes a solid portion having a well for receiving the fluid diverter of the invention;

FIG. 3 is a side sectional view of a fluid diverter constructed in accordance with one embodiment of the invention;

FIG. 4 is a detached perspective view of the fluid diverter of FIG. 3, taken from one end of the cartridge;

DETAILED DESCRIPTION OF THE ILLUSTRATED EMBODIMENT

Figure 1:
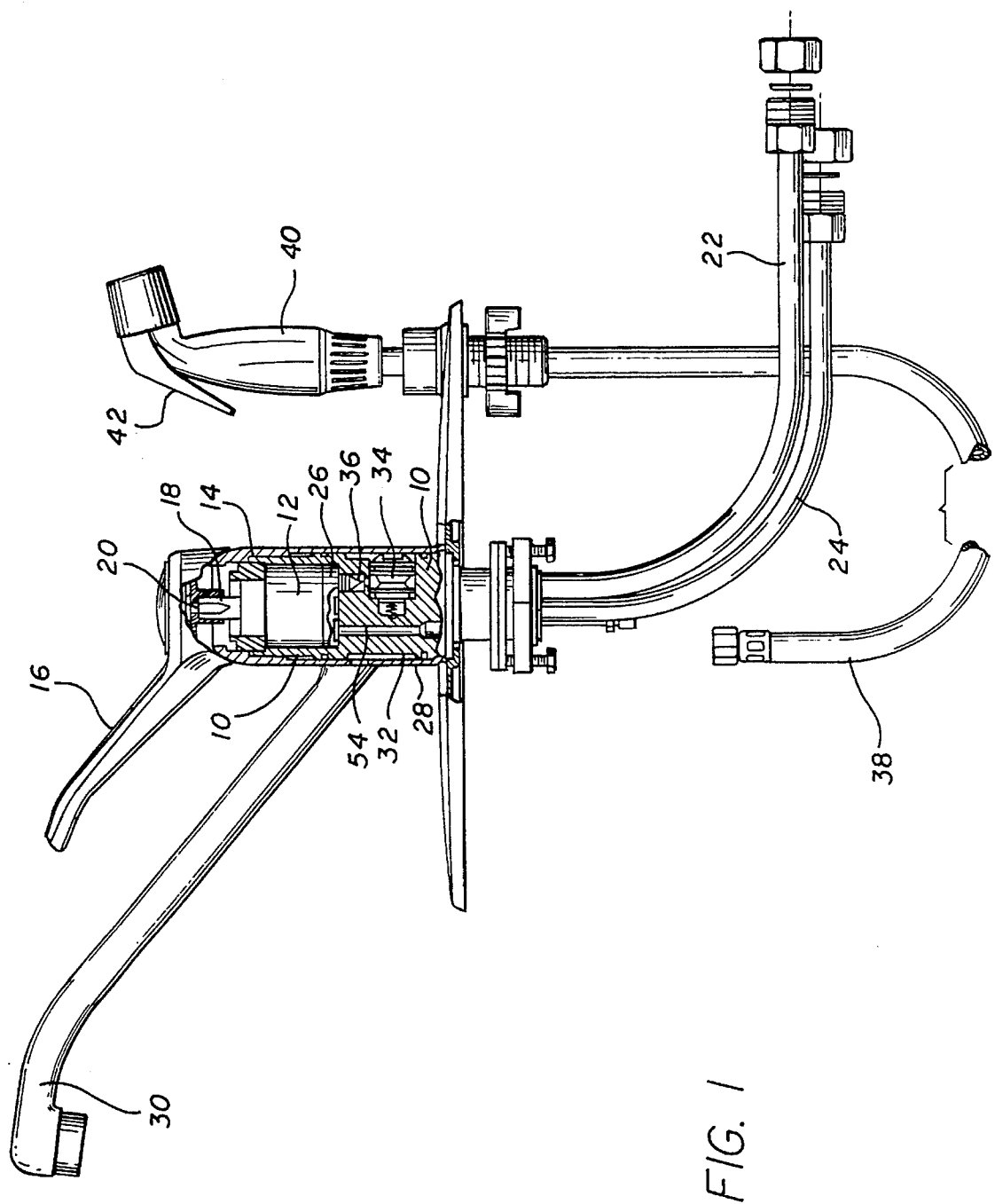
FIG. 1 is a side elevational view, partly in section of a single operator water mixing faucet assembly, including a valve cartridge of the type described and claimed in the co-pending application referred to above, also showing the position of a fluid diverter in the casing of the valve cartridge, the fluid diverter being constructed in accordance with the invention, and also showing the manner in which the faucet assembly is coupled to a handspray.

The single operator water mixing faucet assembly of FIG. 1 includes a casing 10 formed, for example, of brass. The casing 10 is shown in perspective in FIG. 2. The upper end of the casing is hollow to receive a valve cartridge 12 which may be constructed in the manner described in the co-pending application. The lower end of casing 10 is solid. An upper sleeve 14 is threaded to the casing 10, and the upper end of the upper sleeve provides a seat for the operator which may take the form of a control handle 16. The control handle is attached to a lever 18 by means of a screw 20, and it serves to control the operation of the valve cartridge 12 in the manner described in the co-pending application. Specifically, handle 10 is operated to cause the valve cartridge to mix inlet hot and cold water received through tubes 22 and 24, and to direct the resulting water mixture to an outlet port 26 at the top of the solid part of casing 10. A lower sleeve 28 is rotatably supported on the casing 10 below the upper sleeve 14, and a spout 30 is mounted on the lower sleeve to communicate with an annular chamber 32 located between the lower sleeve 28 and the casing 10.

Figure 8:
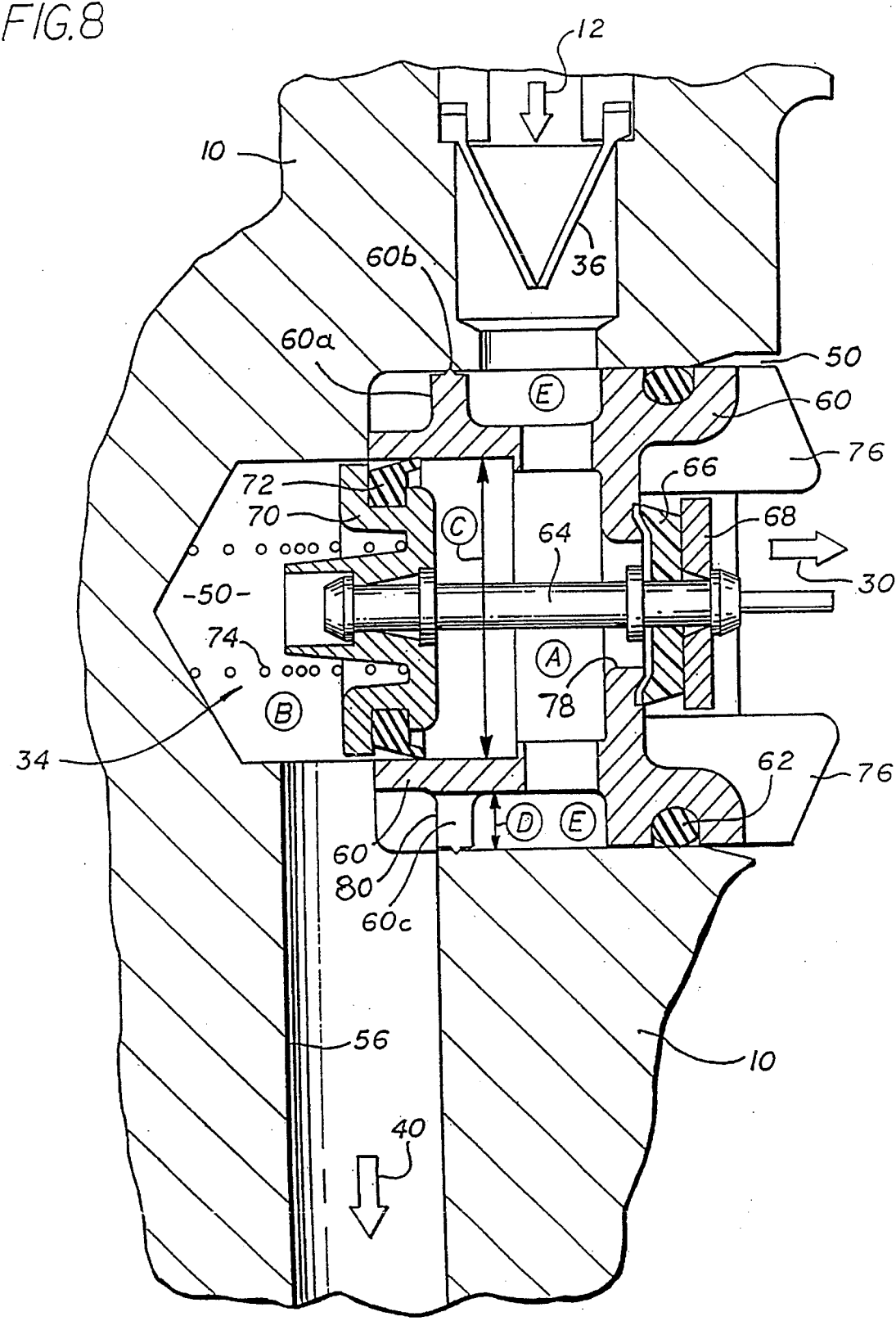
FIG. 8 is a partial sectional view showing the manner in which the fluid diverter of the invention is received in the casing of FIG. 2 and positioned adjacent to the outlet port of the faucet assembly of FIG. 1.

A fluid diverter 34, hereinafter sometimes referred to as the diverter valve cartridge, is received in a radial well 50 in the lower solid end of the casing 10 (FIG. 2), the diverter valve cartridge being constructed in accordance with the concepts of the present invention. The diverter valve cartridge 34 is mounted adjacent to the outlet port of valve cartridge 12 (FIG. 8). A check valve 36 is mounted adjacent to the outlet port to avoid backflow in the event of a pressure loss.

The diverter valve cartridge 34 controls the flow of water from the outlet port of the valve cartridge 12 to the annular space 32 (FIG. 1) in one position of the valve cartridge for flow through spout 30. The water from the outlet port of cartridge 12 flows down through a passage in casing 10 into a tube 38 for flow to a handspray unit 40 for a second position of the diverter valve cartridge. The handspray unit 40 is equipped with a control lever 42 which, when operated, opens a valve in the handspray unit and causes water to flow through the head of the handspray unit. The cartridge valve 34 operates automatically so that whenever the lever 42 is operated, water flow through spout 30 is turned completely off, and all the water flows through the head of handspray unit 40. On the other hand, when the lever 42 is released, the handspray unit 40 is completely turned off, and all water flows through spout 30.

As explained above, the diverter valve cartridge 34 is received in a radial well 50 (FIG. 8) in lower solid end of casing 10. The tubes 22 and 24 pass hot and cold water through the casing 10 through inlets 52 and 54 (FIG. 2). Outlet 56 from the diverter valve unit 30 passes water to the handspray unit 40 through tube 38.

A sectional view of the diverter valve cartridge 34 is shown in FIG. 3. The diverter valve cartridge includes a housing 60 which fits into the well 50 (FIGS. 2 and 8) in casing 10. The housing 60 has an annular rim portion 60a which extends radially outward from the housing, and which includes a peripheral bead 60b that makes sealing contact with the bore of the well 50 in the casing. A notch 60c is formed in the annular rim portion 60a to permit water flow through the rim. An O-ring 62 is received in an annular channel and surrounds the housing 60 at the opposite end of the cartridge to seal the opposite end to the bore of the well 50 in the casing. A metal shaft 64 is mounted in housing 60 for reciprocal linear movement within the housing. A resilient cup valve 66 is mounted on one end of shaft 64 and is held in place on the shaft by a plastic retainer 68. The shaft 64 has annular integral rings, as shown, and the cup valve 66 and retainer 68 are snapped into place between two of the rings at one end of the shaft during assemblage. Cup valve 66 seats against one end of the housing to control the water flow through a port at that end of the housing. A plastic piston 70 is mounted on the opposite end of shaft 64, and it includes a resilient wiper 72 which slides along and at the same time seals the piston to the bore of the interior of the cartridge assembly. The plastic piston is snapped into place between two of the rings at the other end of the shaft during assemblage. A low level compression spring 74 is provided to bias the assembly to a position in which valve 66 is open in the absence of water pressure. A sleeve 76 is provided at the righthand end of the housing to form a guide for the retainer 68 of valve 66, and to abut against the inner surface of sleeve 28 (FIG. 1) to hold the diverter valve assembly from being ejected out of well 50 of casing 10 (FIG. 2). The metal shaft 64 may have a sufficiently small diameter so as not to impede the water flow through the port to any appreciable extent and yet to be rigid enough to operate without flexing.

Figure 5:
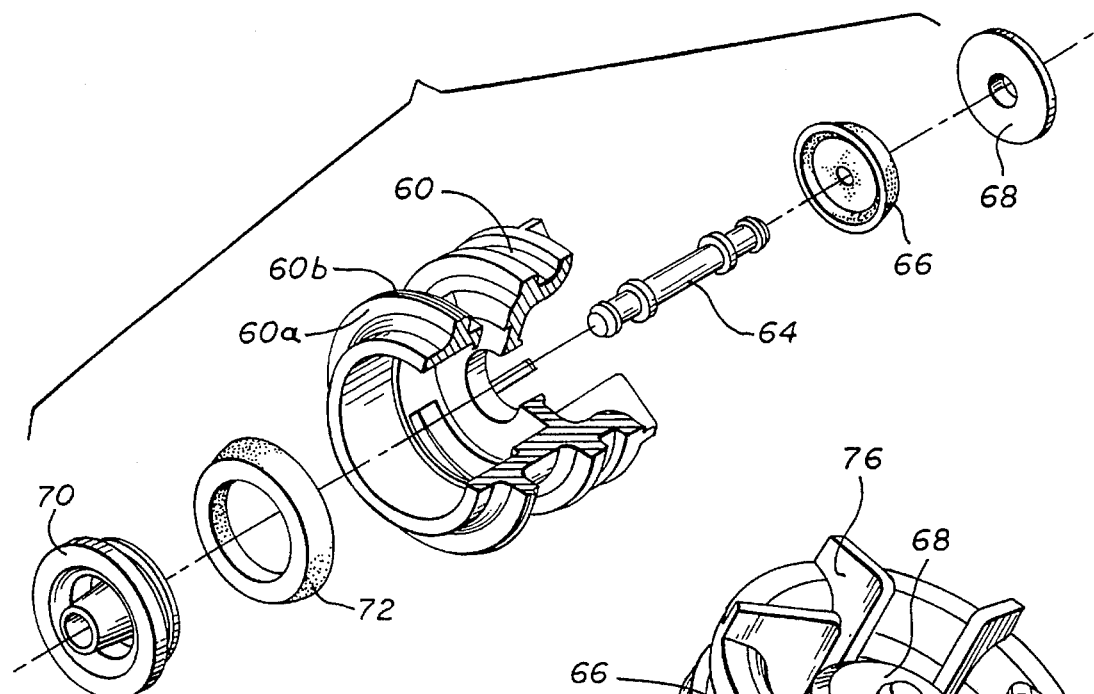
FIG. 5 is a detached perspective view of the fluid diverter of FIG. 3 taken from the other end of the cartridge.
Figure 6:
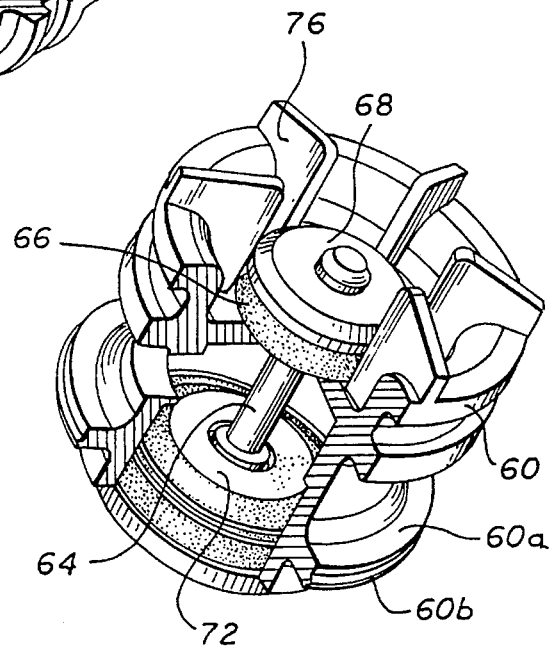
FIG. 6 is a perspective view of the fluid diverter of FIG. 3 taken from one end, and broken away to reveal the internal components of the assembly.
Figure 7:
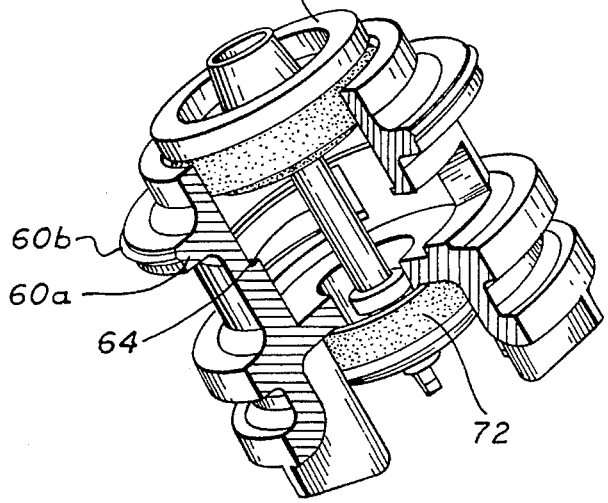
FIG. 7 is a view, like FIG. 6, taken from the opposite end of the assembly.

The various elements of the diverter valve cartridge 34 of FIGS. 1 and 3 are clearly shown in the detached perspective views of FIGS. 4 and 5. The details of the diverter valve cartridge are also shown in the broken-away perspective views of FIGS. 6 and 7.

As shown in FIG. 8, the diverter valve cartridge 34 is received in the well 50 in the casing 10 and has an input port aligned with the output port of the valve cartridge 12 of FIG. 1, with the check valve 36, which is of the duckbill type, interpositioned in the passageway in casing 10 to prevent backflow, as mentioned above. The water from the cartridge 12 flows into a compartment A in the interior of the diverter valve cartridge 34.

When the diverter valve cartridge 34 is inserted into the well 50, the bead 60b on the outer perimeter of the annular rim portion 60a makes sealing contact with the bore of well 50, as described above. The annular bead 60b, together with the O-ring 50, form water-tight seals for an annular compartment E which surrounds the diverter valve cartridge. A further compartment B is defined within the well 50 between the cartridge 34 and the closed end of the well (FIG. 8). When the water pressure is relatively low, the low level compression spring 74 biases shaft 64 to the right in FIG. 8, causing the cup valve 66 to be displaced from its seat on the housing 60 so that the water flowing into the diverter valve cartridge flows out through a first outlet passageway 78 (FIG. 8) formed by the port at the righthand end of the cartridge and into the annular space 32 of FIG. 1 to flow through the spout 30.

As the water pressure flowing into the cartridge 34 is increased, and so long as the lever 42 (FIG. 1) is not operated and the handspray unit 40 is turned off, the water will flow into the compartment A, and into the annular compartment E, and through notch 60c to passage 56 which is coupled to the handspray tube 38 (FIG. 1). Since the valve of the handspray is now closed, the passage 56 rapidly fills, and water flows into compartment B to exert a force against piston 70 to move shaft 64 to the right and hold the valve element 66 firmly off its seat, so that water flow to the spout 30 is established.

However, when the lever 42 of the handspray unit 40 is operated, water flows through the passage 56 (FIG. 8) to the handspray unit which reduces the pressure in the passage 56 and in compartment B. At the same time, water continues to flow from compartment A through a second outlet passageway 80 (FIG. 8), formed by notch 60c, into the passage 56 and into compartment B.

The ratio of the areas specified by diameters C and D of the compartment A as compared with compartment E is of the order of 27:1, for example, to establish a pressure differential between compartments A and B this pressure differential maintains pressure within compartment A to bear against the righthand side of piston element 70, with a lower pressure in compartment B. This causes piston element 70 to be forced to the left in FIG. 8 against the spring 74 to cause valve 66 to seat firmly against its seat on the housing 60. This action immediately cuts off the water flow through passageway 78 to the spout 30, and establishes a water flow through passageway 80 formed by notch 60c to the handspray unit 40. At the same time, sufficient pressure is retained in compartment A to bear against the piston 70 to force shaft 64 to the left and hold the valve element 66 securely against its seat thereby sealing passageway 78.

The result is that whenever the handspray unit 40 is operated, the diverter valve cartridge 34 immediately causes its shaft 64 to shift to the left, and sufficient pressure to be built up against the righthand side of piston element 70, so as to retain the valve element 66 in its closed position. However, upon the release of lever 42 water flow through the handspray unit is cut off and water pressure immediately builds up in compartment B to force shaft 64 to the right and open valve 66. This latter action establishes water flow to spout 30.

As described above, water flow to the handspray unit 40 is through passageway 80 formed by notch 60c in rim 60a. The notch 60c is made sufficiently large to pass contaminant particles out of the cartridge 34 to obviate any tendency for the cartridge to become clogged. The notch 60c may be made sufficiently large to pass most contaminant particles, however, its size is limited since it must maintain a pressure differential between compartments A and B when the handspray unit 40 is being operated.

The invention provides, therefore, an improved miniature diverter valve cartridge for faucet assemblies which provides an automatic diversion of water from the spout to the handspray unit whenever the valve in the handspray unit is opened. The cartridge of the invention is simple in its construction, and operates on a positive basis to maintain an absolute seal against the flow of water to the spout when the handspray is being operated. Moreover, the diverter valve cartridge of the invention is not subject to becoming clogged by particle contaminants.

It will be appreciated that while a particular embodiment of the invention has been shown and described, modifications may be made. The appended claims are intended to cover all such modifications which come within the true spirit and scope of the invention.

I claim:

1. A fluid diverter adapted to be received in a cavity in a solid body, said diverter comprising: a tubular elongated housing adapted to be received in said cavity to define a first compartment between the inner end of said housing and the inner end of said cavity and defining a second compartment within the housing, an inlet port at one side of the housing, and a first outlet passageway at the outer end of said housing; a shaft mounted in said housing in coaxial relationship therewith for rectilinear movement along the longitudinal axis of said housing; a piston member mounted on one end of said shaft in continuous sliding sealed relationship with the inner wall of said housing and serving to separate the first and second compartments; a valve member mounted on the other end of said shaft in position to open and close said first outlet passageway in response to rectilinear movement of said shaft; said housing defining a second outlet passageway communicating with the interior of said first compartment; and means defining a passage from said second compartment through said second outlet passageway to provide restricted water flow from said second compartment to said first compartment and through said second outlet passageway.

2. The fluid diverter defined in claim 1, in which said solid body is a casing included in a water faucet assembly and in which pressurized outlet water from said faucet assembly flows to said inlet port.

3. The fluid diverter defined in claim 2, in which said first outlet passageway is coupled to a spout included in said faucet assembly.

4. The fluid diverter defined in claim 2, in which said second outlet passageway is coupled to a spray unit, and in which water pressure is established in said first compartment and when said spray unit is turned off which acts to bias said piston member and said shaft in a direction to cause said valve member to open said first outlet passageway, and in which water pressure is developed in said first compartment which is less than the water pressure in said second compartment when said spray unit is operated which acts to bias said piston member and said shaft in a direction to cause said valve member to close said first outlet passageway.

5. The fluid diverter defined in claim 2, and which includes a check valve mounted adjacent to said inlet port to prevent backflow of water into said faucet assembly in the event of failure of water pressure therein.

6. The fluid diverter defined in claim 1, in which said housing defines an integral annular rim having a peripheral bead which engages the inner wall of said cavity in sealing relationship therewith, and in which said rim has a notch therein to form said last-named means for providing restricted water flow from said second compartment to said first compartment and to establish a predetermined pressure differential therebetween when said second outlet passageway is opened.

7. The fluid diverter defined in claim 1, in which pressurized water is introduced into said inlet port, and in which water pressure is established in said first compartment and when said second outlet passageway is closed which acts to bias said piston member and said shaft in a direction to cause said valve member to open said first outlet passageway, and in which water pressure is developed in said first compartment which is lower than the water pressure in said second compartment when said second outlet passageway is open which acts to bias said piston member and said shaft in a direction to cause said valve member to close said first outlet passageway.

8. The fluid diverter defined in claim 1 in which said shaft is framed of metal having two integral annular members at each end, and in which said piston member is framed of plastic having an annular resilient wiper member mounted thereon, and in which said valve member is formed of a resilient material, and which includes a plastic retainer for said valve member, said piston being mounted on said shaft at one end between the two integral annular members at said one end, and said valve member and retainer being mounted on said shaft at the other end between the two integral annular members at said other end.

9. A fluid diverter adapted to be received in a cavity in a solid body, said diverter comprising: a tubular elongated housing adapted to be received in said cavity to define a first compartment between the inner end of said housing and the inner end of said cavity and defining a second compartment within the housing, said housing defining an integral annular rim having a peripheral bead which engages the inner wall of said cavity in sealing relationship therewith, inlet port at one side of the housing, and a first outlet passageway at the outer end of said housing; a shaft mounted in said housing in coaxial relationship therewith for rectilinear movement along the longitudinal axis of said housing; a piston member mounted on one end of said shaft in sliding sealed relationship with the inner wall of said housing and serving to separate the first and second compartments; a valve member mounted on the other end of said shaft in position to open and close said first outlet passageway in response to rectilinear movement of said shaft; said housing defining a second outlet passageway communicating with the interior of said first compartment; and means formed by a notch in said rim of said housing and defining a passage from said second compartment through said second outlet passageway to provide restricted water flow from said second compartment to said first compartment and through said second outlet passageway.

10. A fluid diverter adapted to be received in a cavity in a solid body, said diverter comprising: a tubular elongated housing adapted to be received in said cavity to define a first compartment between the inner end of said housing and the inner end of said cavity and defining a second compartment within the housing, an inlet port at one side of the housing, and a first outlet passageway at the outer end of said housing; a shaft mounted in said housing in coaxial relationship therewith for rectilinear movement along the longitudinal axis of said housing; a piston member mounted on one end of said shaft in sliding sealed relationship with the inner wall of said housing and serving to separate the first and second compartments; a valve member mounted on the other end of said shaft in position to open and close said first outlet passageway in response to rectilinear movement of said shaft; said housing defining a second outlet passageway communicating with the interior of said first compartment;

means defining a passage from said second compartment through said second outlet passageway to provide restricted water flow from said second compartment to said first compartment and through said second outlet passageway, said shaft being framed of metal having two integral annular members at each end, and in which said piston member is framed of plastic having an annular resilient wiper member mounted thereon, and in which said valve member is formed of a resilient material, and which includes a plastic retainer for said valve member, said piston member being mounted on said shaft at one end between the two integral annular members at said one end, and said valve member and retainer being mounted on said shaft at the other end between the two integral annular members at said other end.

* * * * *